F. R. PETERSON.
BRAKE ATTACHMENT FOR AUTOMOBILES.
APPLICATION FILED OCT. 21, 1921.

1,436,903.

Patented Nov. 28, 1922.

Inventor,
Frederick Reynold Peterson
By J. R. Jochum Jr. Atty

Patented Nov. 28, 1922.

1,436,903

UNITED STATES PATENT OFFICE.

FREDERICK REYNOLD PETERSON, OF SPOKANE, WASHINGTON.

BRAKE ATTACHMENT FOR AUTOMOBILES.

Application filed October 21, 1921. Serial No. 509,303.

*To all whom it may concern:*

Be it known that I, FREDERICK REYNOLD PETERSON, a citizen of the United States, residing at Spokane, in the county of Spokane and State of Washington, have invented certain new and useful Improvements in Brake Attachments for Automobiles, of which the following is a specification.

This invention relates to improvements in brake attachment for automobiles, particularly adapted though not necessarily limited in its use on Ford cars, and one of the objects of the invention is to provide an improved attachment of this character by means of the use of which both the foot brake and the emergency brake may be applied and held by means of the emergency lever and at the same time the attachment will not interfere with the operation of the foot brake independently of the emergency brake when the latter is not in use, and the speed or control of the motor will not be interfered with.

A further object is to provide an improved attachment of this character which will be simple, durable and cheap in construction, effective and efficient in operation and which may be readily applied or removed without requiring the services of a skilled mechanic.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1:
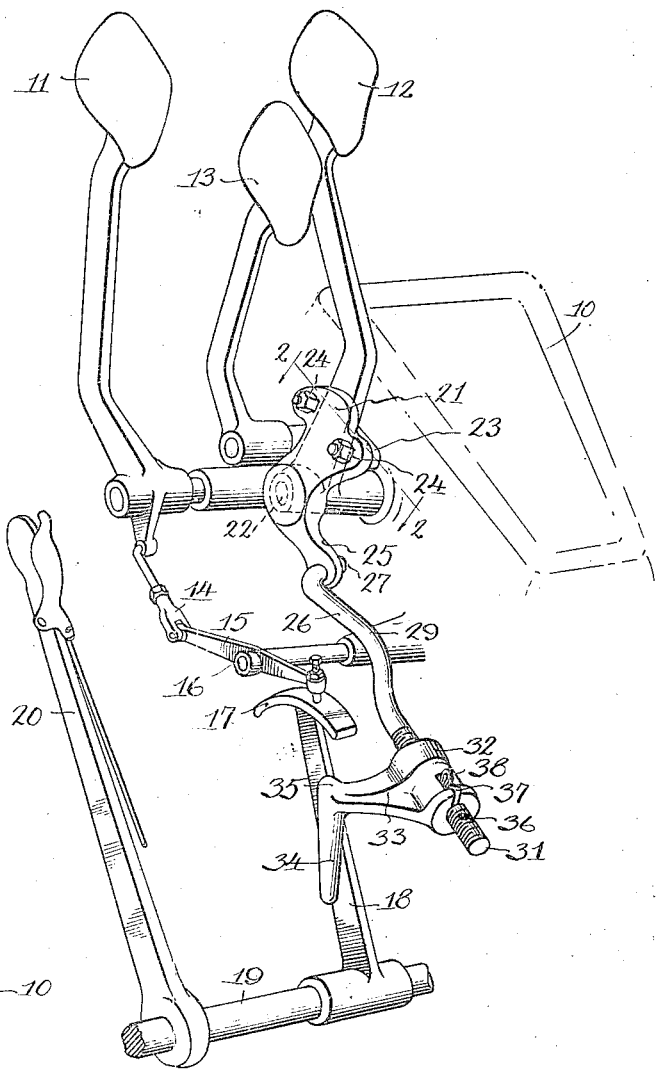
Figure 1 is a fragmentary perspective view of a portion of an automobile showing the controlling pedals and the emergency lever with an attachment applied thereto constructed in accordance with the principles of this invention.
Figure 2:
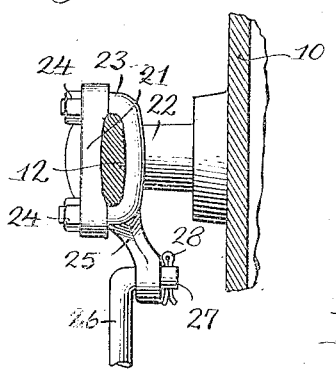
Figure 2 is a detail sectional view taken on line 2—2, Figure 1.

Referring more particularly to the drawing the numeral 10 designates generally the transmission housing of a Ford automobile, 11 indicates the clutch pedal, 12 the transmission brake pedal and 13 the reverse pedal, all of the ordinary and well known construction of the Ford type of car.

The clutch pedal 11 is connected by means of the usual link 14 with the rocker arm 15 of the control shaft 16 and the rocker arm 15 co-operates with the cam 17 on the upwardly projecting crank arm 18 and which crank arm is in turn connected with a high speed controlling shaft 19. The shaft 19 is provided with an emergency hand lever 20, and all of the above referred to parts are of the ordinary and well known construction. The shaft 19 is provided with the usual connections with the brake rods which lead to the emergency brakes, all as well known in cars of this character.

Connected with the arm of the transmission brake pedal 12 is a member 21 preferably in the form of a casting, the body portion of which is shaped to receive the end 22 of the brake pedal and this member is secured in position in any desired or suitable manner preferably by means of a U-shaped member 23 engaging the opposite side of the arm of the pedal with its extremities threaded and passing through apertures in the member 21, the said threaded extremities receiving nuts 24 by means of which the parts may be clamped together. The member 21 is provided with a depending portion 25 provided with an eye therethrough and this member 21 together with the portion 25 are so shaped that they will not interfere with the operation of any of the other parts of the mechanism and will not interfere with the operation of the pedal to which it is attached.

A rod or bar 26 is connected with the depending portion 25 of the member 21 by one end thereof, the extremity of the rod being deflected as at 27 to pass through the aperture in the extremity of the portion 25 so that the rod will be pivotally connected with the member and the rod is held against displacement in any desired or suitable manner such as by means of a cotter pin 28.

This rod may be of any desired length and is provided intermediate its ends with a curved or bent portion 29 so as to permit the rod to pass over the control shaft 16, the extremity of the end 31 of the rod being provided with screw threads.

Adjustably connected with the free end of the rod 26 is a member 32 embodying a body portion having a threaded aperture therethrough and into which aperture the threaded extremity 31 of the rod 26 passes. This member 32 is provided with a laterally projecting arm 33 and a depending hook like portion 34 at the extremity of the arm. The arm 33 is of such a size and length as to extend over and slightly beyond the cam arm 18 so that the depending portion 34 will engage over the cam arm and stand adjacent the lateral face thereof so as to hold the rod 26 and the member 32 against lateral displacement with respect to the cam arm 18. The arm 33 of the member 32 is also provided with a forwardly projecting portion 35 so that when the emergency brake 20 is adjusted to a position beyond the perpendicular, the member 32 will be prevented from slipping off or disengaging the cam arm 18.

To apply this improved attachment all that is necessary is to adjust the emergency lever 20 into a neutral position. Then attach the member 21 to the transmission brake pedal 12 by means of the clamping bolt or element 23. Then adjust the member 32 upon the rod or bar 26 until the arm 33 is in engagement behind the cam arm 18 with the arm 33 extending over the cam arm 18 so that the downwardly projecting portion 34 will stand adjacent the outside of the cam arm and the forwardly projecting portion 35 of the arm 32 will stand on the same side of the cam arm as the portion 34.

In order to hold the member 32 in its adjusted position with respect to the bar or rod 26 any suitable fastening device may be provided but a simple and efficient means for this purpose embodies a series of holes or apertures 36 which pass through the threaded portion of the rod 19. The member 32 is provided with slots 37 therethrough which are disposed opposite to each other and these slots 37 are so arranged that when the arm 33 is in its adjusted position behind the cam arm 18 they will register with one of the openings 36 in the rod 26 so that a fastening device such as a cotter pin 38 may be passed through the slots 37 in the member 32 and also through the opening 36.

With this improved construction it will be manifest that when the emergency lever 20 is moved from a neutral position and in a direction to apply the emergency brake, the cam arm 18 will connect the arm 33 of the member 32 and through the medium of the bar 26 and the member 21 will rock the transmission brake pedal forwardly in a direction to apply the foot brakes.

When it is desired to apply the foot brakes independently of the emergency brake, it will be seen that this can be readily accomplished by reason of the fact that there is no direct or positive connection between the emergency brake applying means and the foot brake applying means. As the brake pedal 12 is actuated the depending portion 25 of the member 21 will move the rod 26 in a direction to cause the member 32 and arm 33 to move away from the cam arm 18.

It will also be manifest that this attachment may be readily applied to any machine of this type and may be as readily removed.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. In combination, a brake pedal, a transverse rocking shaft in rear of the pedal, an arm on the shaft, means for rocking the shaft, means connecting the said pedal with the said shaft whereby the rocking of the shaft by the first recited means will actuate the pedal, the last said means permitting the operation of the pedal independently of the shaft and embodying a link connected with the pedal, one end of the link being disposed adjacent the said arm, a collar like member connected with the said end of the link and adjustable longitudinally of the link, and a projection connected with the collar like element for engaging behind the said arm.

2. In combination, a brake pedal, a transverse rocking shaft in rear of the pedal, an arm on the shaft, means for rocking the shaft, means connecting the said pedal with the said shaft whereby the rocking of the shaft by the first recited means will actuate the pedal, the last said means permitting the operation of the pedal independently of the shaft and embodying a link connected with the pedal, one end of the link being disposed adjacent the said arm, a collar like member connected with the said end of the link and adjustable longitudinally of the link, a projection connected with the collar like element for engaging behind the said arm, and means connected with the said collar like member and co-operating with the said arm for maintaining the said member in co-operative relation with the said arm.

3. In combination, a brake pedal, a transverse rocking shaft in rear of the pedal, an arm on the shaft, means for rocking the shaft, means connecting the said pedal with the said shaft whereby the rocking of the shaft by the first recited means will actuate the pedal, the last said means permitting the operation of the pedal independently of the shaft and embodying a link connected with the pedal, one end of the link being disposed adjacent the said arm, and a collar like element connected with the said end of the link and adjustable longitudinally of the link, said element embodying an open hook shaped portion adapted to engage over the said arm.

4. In combination, a brake pedal, a transverse rocking shaft in rear of the pedal, an arm on the shaft, means for rocking the shaft, means connecting the said pedal with the said shaft whereby the rocking of the shaft by the first recited means will actuate the pedal, the last said means permitting the operation of the pedal independently of the shaft and embodying a link connected with the pedal, one end of the link being disposed adjacent the said arm, a collar like element connected with said end of the link and adapted to engage behind the said arm, and means whereby the collar may be adjusted with respect to the point of connection of the link with the pedal and in a direction lengthwise of the link.

5. In combination, a brake pedal, a transverse rocking shaft in rear of the pedal, an arm on the shaft, means for rocking the shaft, means connecting the said pedal with the said shaft whereby the rocking of the shaft by the first recited means will actuate the pedal, the last said means permitting the operation of the pedal independently of the shaft and embodying a link connected with the pedal, one end of the link being disposed adjacent the said arm, a collar like element connected with said end of the link and adapted to engage behind the said arm, means whereby the collar may be adjusted with respect to the point of connection of the link with the pedal and in a direction lengthwise of the link, and means connected with the said element for maintaining the latter against lateral displacement with respect to the said arm.

6. In combination, a brake pedal, a transverse rocking shaft in rear of the pedal, an arm on the shaft, means for rocking the shaft, a member connected with the pedal, a rod pivotally connected with the member, one end of the link being disposed adjacent the said arm and being threaded, a collar like member threaded upon said end of the link, means for locking the collar in its adjusted position with respect to the link, and a projection on said member engaging behind the said arm.

7. In combination, a brake pedal, a transverse rocking shaft in rear of the pedal, an arm on the shaft, means for rocking the shaft, a member connected with the pedal, a rod pivotally connected with the member, one end of the link being disposed adjacent the said arm and being threaded, a collar like member threaded upon said end of the link, means for locking the collar in its adjusted position with respect to the link, and a plurality of projections on said member adapted to engage behind the said arm in different positions of the latter for maintaining the said member in operative position with relation to the arm.

8. In combination, a brake pedal, a transverse rocking shaft in rear of the pedal, an arm on the shaft, means for rocking the shaft, a member connected with the pedal, a rod pivotally connected with the member, one end of the link being disposed adjacent the said arm and being threaded, a collar like member threaded upon said end of the link, means for locking the collar in its adjusted position with respect to the link, said member engaging behind the said arm, there being apertures through the said link and a fastening pin adapted to pass through the said apertures for locking the said member against adjustment with respect to the link.

9. In combination, a brake pedal, a transverse rocking shaft in rear of the pedal, an arm on the shaft, means for rocking the shaft, a member connected with the pedal, a rod pivotally connected with the member, one end of the link being disposed adjacent the said arm and being threaded, a collar like member threaded upon said end of the link, means for locking the collar in its adjusted position with respect to the link, said member engaging behind said arm, there being apertures through the said link, there being also openings through the said member adapted to register with one of the said apertures, and a fastening device passing through the registering apertures for locking the said member against adjustment with respect to the link.

In testimony whereof I have signed my name to this specification, on this 11th day of October, A. D. 1921.

FREDERICK REYNOLD PETERSON.